W. SHAW.
TRANSMISSION.
APPLICATION FILED JUNE 29, 1917.
1,256,174.
Patented Feb. 12, 1918.
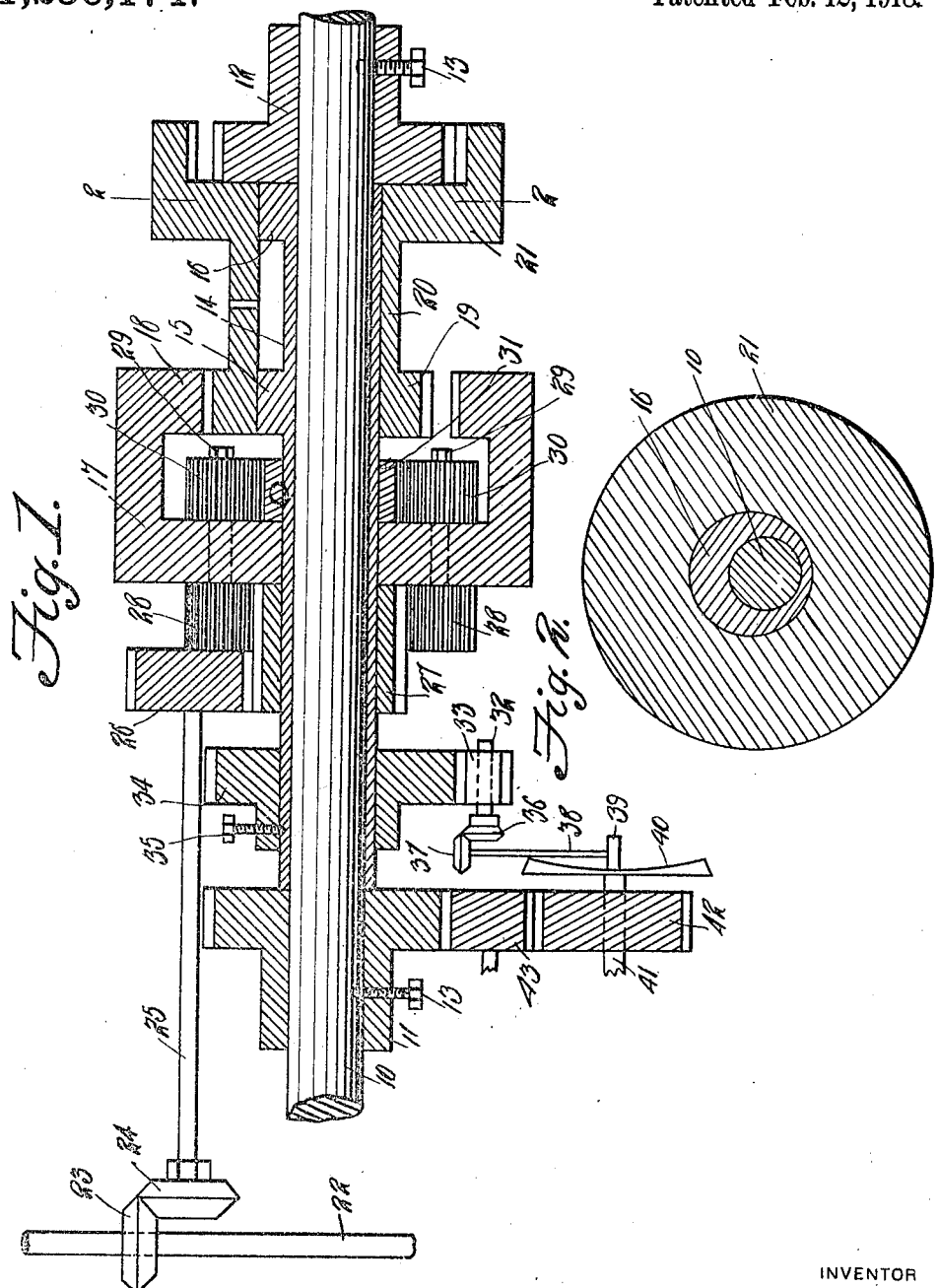

UNITED STATES PATENT OFFICE.

WILLIAM SHAW, OF PITTSFIELD, NEW HAMPSHIRE.

TRANSMISSION.

1,256,174.  Specification of Letters Patent.  Patented Feb. 12, 1918.

Application filed June 29, 1917. Serial No. 177,795.

*To all whom it may concern:*

Be it known that I, WILLIAM SHAW, a citizen of the United States, residing at Pittsfield, in the county of Merrimack and State of New Hampshire, have invented certain new and useful Improvements in Transmissions, of which the following is a specification.

This invention relates to an improved transmission for use in connection with driving an automobile and the principal object of the invention is to provide a transmission so constructed that the speed of rotation of the rear or driving axle of the automobile may be controlled with respect to the speed of rotation of the engine shaft and the driving axle either rotated at a greater or less speed than the engine shaft or at the same speed, and to also so construct this transmission that the rotation of the driving axle may be entirely stopped if so desired with the engine shaft still running.

Another object of the invention is to provide a transmission which will be compact and thus take up a minimum amount of space and to further construct a transmission which will be easy to assemble and easy to take apart when so desired for cleaning purposes or for making necessary repairs.

Another object of the invention is to provide a transmission which will be comparatively simple in construction and which will be strong and durable.

This invention is illustrated in the accompanying drawings, wherein:—

Figure 1 is a view showing the improved transmission in section, and

Fig. 2 is a transverse sectional view through the transmission along the line 2—2 of Fig. 1.

The engine shaft 10 will be rotatably mounted and driven from the engine in the usual manner and carries spur gears 11 and 12 which are secured fast upon the engine shaft by set screws or other fasteners 13 so that these spur gears may be released when desired. These spur gears in addition to acting as gears also serve as abutment collars to prevent longitudinal sliding movement of the sleeve 14 loosely mounted upon the shaft between the gears 11 and 12 and provided with eccentrics or cams 15 and 16. A block or housing 17 is loosely mounted upon the sleeve 14 and is provided with a toothed flange 18 meshing with the teeth of the external gear 19 formed at one end of the sleeve 20. This sleeve 20 is provided at its opposite end with an internal gear 21 which will be engaged by the teeth of the spur gear 12. From an inspection of Fig. 1 it will be readily seen that by rotating the sleeve 14, the sleeve 20 will be given a movement transversely of the shaft 10 through the action of the eccentrics or cams 15 and 16 and thus the external gear 19 and the internal gear 21 brought into engagement with the internal gear 17 and spur gear 12 at different points about the last gears mentioned.

The driving axle or rear axle 22 of the automobile is provided with a gear 23 meshing with a gear 24 upon the rear end portion of shaft 25 which shaft extends forwardly parallel to the engine shaft 10 and will be rotatably mounted and provided at its forward end with a gear 26 meshing with a toothed sleeve or gear 27 loose upon the sleeve 14. This gear 27 is surrounded by gears 28, the stems 29 of which are journaled in the block or internal gear 17 and carry gears 30 which gears are positioned about and mesh with the gear 31 fast upon the sleeve 14. It will thus be seen that when the sleeve gear 27 is rotating, the gear 26 will be rotated and as the shaft 25 is rotated with the gear 26, rotary movement will be transmitted to the axle 22 through the medium of the friction gears 23 and 24. A rotatably mounted shaft 32 carries a gear or pinion 33 meshing with the spur gear 34 held rigid upon the sleeve 14 by the set screw or other fastener 35 so that when desired, this spur gear may be released. A friction gear 36 is carried by the shaft 32 and meshes with a friction gear 37 carried by the shaft 38 which shaft will be rotatably mounted and carry at its opposite end a friction gear 39 engaging the friction disk 40 carried by the shaft 41. This shaft 41 carries a gear 42 and in order to transmit rotary movement from the gear 42 to the gear 11, there has been provided an intermediate gear 43 which is positioned between the gears 42 and 11 and meshes with the teeth of these two gears.

The operation of this improved transmission is as follows. For the convenience of illustration let it be assumed that the engine shaft is making 500 revolutions per minute. Again let it be assumed that the friction gear 39 is in the center of the disk 40 as shown in Fig. 1. In such a case, gear 12 will rotate gear 21 and as this gear is cast with spur gear 19, also rotates gear 18, and also block 17 which carries gears 30, and 28. These gears are made to rotate around gear 31 fast upon the sleeve 14 and around gear 27 loose upon sleeve 14.

To this point it can be seen that the sleeve 14 and gears 31 and 27 are standing still. The lowest speed is obtained by slightly shifting friction gear 39 toward the larger working area of the disk 40 which allows gears 37, 36, 33 and 34 freedom to rotate which also imparts motion to sleeve 14. In the above manner any intermediate speeds are obtained.

Friction gear 39 can be shifted to a point on the disk so as to give gear 34 the maximum speed of 500 same as the engine shaft 10, when the whole mechanism becomes locked and acts as one piece, gear 27 making 500 revolutions per minute and driving gear 26, 500 revolutions per minute, assuming that gears 27 and 26 have the same number of teeth.

At this point it can be seen that very little wear takes place when the automobile is run at its highest speed. Friction gear 39 acts as a governor and checks cam sleeve 14. When the machine is running at its lowest speed sleeve 20 rotates on cams 15 and 16, and has a tendency of taking the cams and sleeve 14 around with it. The efficiency of the motion can be best understood assuming that the engine shaft 10 is stopped and that the sleeve 14 is made to rotate in the same direction as that of the engine shaft. In such a case internal gear 21 is made to circle gear 12, and this is just what takes place when gear 12 and sleeve 14 rotate in the same direction and it is from this source that power is imparted to the axle of the automobile.

What is claimed is:—

1. A transmission comprising an engine shaft, a rotatable axle, a sleeve mounted upon the engine shaft, gears secured to the engine shaft, a sleeve fitting upon the shaft between the gears, cam extensions formed upon the sleeve, a sleeve fitting upon the cams and extending longitudinally of the first mentioned sleeve, a housing at one end of the second mentioned sleeve, a gear upon the first mentioned sleeve within the housing, a gear upon the first mentioned sleeve outside the housing, a shaft extending longitudinally of the engine shaft and provided at one end with a gear meshing with the last mentioned gear, and at the opposite end with means for transmitting rotary movement to the axle, gears rotatably connected with the housing and meshing with the last mentioned gear carried by the first mentioned sleeve, an internal gear carried by the second mentioned sleeve and positioned for meshing with one of the first mentioned gears of the engine shaft, a gear having operative connection with the second gear of the engine shaft, a shaft for the last mentioned gear having a friction disk at one end, a shaft provided at one end with a friction gear engaging the friction disk, a shaft having rotary connection with the last mentioned shaft, and a gear carried by the last mentioned shaft and meshing with the gear carried by the first mentioned sleeve.

2. A transmission comprising an engine shaft, an axle, an intermediate shaft extending longitudinally of the engine shaft and having operative connection with the axle and provided with a gear at its opposite end, spur gears rigid upon the engine shaft, a sleeve loose upon the engine shaft between the spur gears and provided with a gear meshing with the gear of the intermediate shaft, a spur gear rigid upon the sleeve, eccentric cams carried by the sleeve, an outer sleeve positioned about the first mentioned sleeve and fitting upon the cams thereof and provided with an internal gear at one end for engagement with one of the spur gears of the engine shaft, a housing at the opposite end of the outer sleeve, a gear carried by the first mentioned sleeve within the housing, pins extending through one wall of the housing and carrying inner and outer gears meshing with the gears of the inner sleeve, a spur gear rigid upon the inner sleeve, a gear rotated from the second spur gear of the engine shaft and having a friction disk in operative connection therewith, a shaft provided with a friction gear for engaging the friction disk and moving radially thereof, a shaft having operative connection with the last mentioned shaft, and a gear carried by the last mentioned shaft and having operative connection with the last mentioned spur gear of the first mentioned sleeve.

3. A transmission comprising an engine shaft, an axle, an intermediate shaft having operative connection with the axle and extending longitudinally of the engine shaft and provided at one end with a gear, a sleeve loosely mounted upon the engine shaft and provided with cam extensions, an outer sleeve fitting loose upon the inner sleeve and engaged by the cam extensions thereof, a spur gear carried by the engine shaft, an inner gear carried by the outer sleeve for engagement with the spur gear, an outer gear at the opposite end of the outer sleeve, a housing fitting upon the inner sleeve and provided at one end with an inner gear for engagement with the outer gear of the outer sleeve, a gear carried by the inner sleeve and having operative engagement with the gear of the intermediate shaft, a gear carried by the inner sleeve within the housing, gears rotatably connected with the housing for engaging the gears of the inner sleeve, a second gear carried by the engine shaft, and means for imparting rotary movement from the second gear of the engine shaft to the inner sleeve to rotate the inner sleeve and adjust the position thereof.

4. A transmission comprising an engine shaft, an axle, an inner sleeve fitting upon the engine shaft, an outer sleeve fitting about the inner sleeve, cam extensions carried by the inner sleeve for guiding the movement of the outer sleeve about the inner sleeve, an outer gear carried by the outer sleeve, a housing fitting upon the inner sleeve and provided with an inner gear for engagement with the outer gear of the outer sleeve, intermeshing gears carried by the inner sleeve and housing with the gears of the housing traveling about the gears of the inner sleeve when the housing rotates, means for transmitting rotary movement from one of the gears of the inner sleeve to the axle, means for rotating the outer sleeve with the engine shaft, and means for imparting rotary movement from the engine shaft to the inner sleeve and including a concaved friction disk and a shaft having a friction gear mounted thereon in operative engagement with the friction disk and adjustable radially of the disk.

In testimony whereof I affix my signature in presence of two witnesses.

WILLIAM SHAW.

Witnesses:
FRANK M. CHASE,
OSCAR GENEST.